United States Patent Office

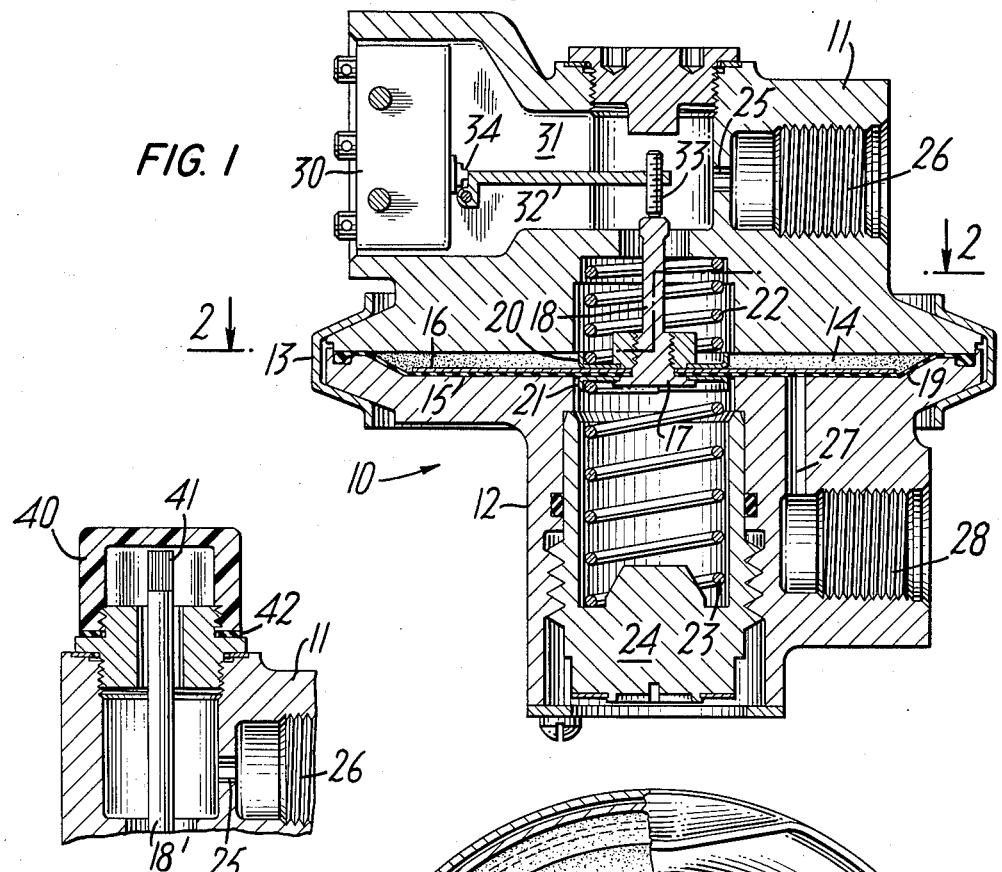
FIG. 1
FIG. 3
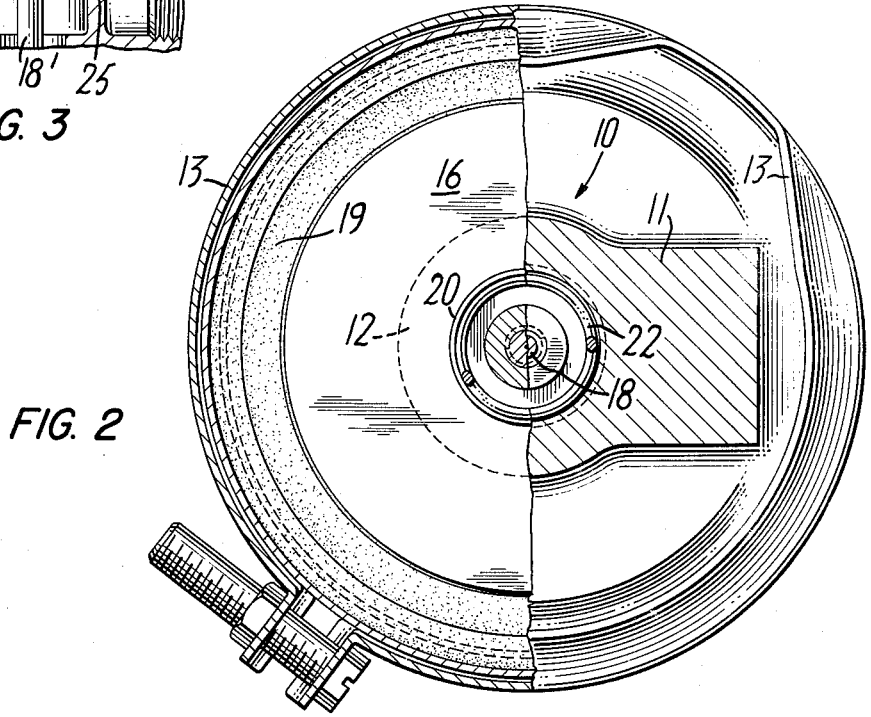
FIG. 2

3,209,721
Patented Oct. 5, 1965

3,209,721
PRESSURE-RESPONSIVE DEVICES
David B. Pall, Roslyn Estates, and Mathias P. L. Siebel, Glen Cove, N.Y., assignors to Pall Corporation, Glen Cove, N.Y., a corporation of New York
Filed Apr. 6, 1961, Ser. No. 101,107
8 Claims. (Cl. 116—70)

This invention relates to pressure-responsive devices, such as pressure indicators and transducers, wherein the occurrence of a pressure differential greater than a predetermined value between two parts of the same or different systems results in actuating a magnetic device to give an indication thereof or to operate a switch or like device.

In fluid systems wherein fluid such as air or the like is passed through a filter, it is desirable to provide external means for indicating clogging of the filter element, such as may result from accumulation of sufficient dirt to impede the flow of gas therethrough. Inasmuch as the pressure drop across the filter increases in proportion to the accumulation of dirt in and on the filter element, a suitable indication may be obtained by utilizing a differential pressure device arranged to be actuated when the pressure drop across the filter reaches a predetermined value. Such differential pressure devices can also be employed to actuate a switch or other mechanism, for the purpose, for example, of giving an audible or illuminated signal, or shutting off the flow fluid.

In the pressure-indicating device of the invention, a spring biased flexible diaphragm assembly adapted to respond to changes in pressure is arranged in combination with indicating means to give an indication of any such response. The diaphragm assembly normally is biased in one of the two possible directions of motion by a predetermined first spring force. Movement in the direction in which it is biased is impeded by a stop, such as the housing. Movement in the other direction, due to application of differential pressure to the diaphragm, is resisted by this bias action, and this movement is assisted by a second but lesser spring force. By the combined action of the two spring forces movement of the diaphragm is restricted so that no motion takes place until a pressure differential greater than a predetermined amount is obtained, and at such actuating predetermined pressure differential the diaphragm responds to give an indication of the change.

The spring force normally would be supplied by springs, preferably coil springs. The first spring force is greater than the second, the magnitude of which with respect to the first determines the actuating pressure differential. This is readily adjusted to meet any need within the range of pressures the devices can sense from about 0.01 inch of water column to about 50 p.s.i., simply by appropriate selection of the two springs. Such selection is a matter of mechanics and calculation within the skill of anyone versed in this art.

In order to obtain rapid response of the diaphragm and indicating means at the actuating pressure differential, the springs should have a low rate. Conversely, slow response is obtained using springs of high rates.

FIGURE 1 is a view in longitudinal section taken through a typical pressure-responsive device arranged according to the invention to actuate a switch;

FIGURE 2 is a sectional view, taken on the lines 2—2 of FIGURE 1, and looking in the direction of the arrows;

FIGURE 3 is a view in longitudinal section taken through another embodiment of pressure-responsive device, arranged to give a visual signal.

The pressure-responsive transducer of FIGURES 1 and 2 comprises a housing 10 formed in upper and lower portions 11 and 12, respectively, held together by a V-band clamp 13.

The upper and lower portions of the housing between them define a chamber 14 provided with a lower wall 15 matching a plate 16. Supported on the plate 16 between it and enlarged head 17 of the rod 18 is a flexible rubber diaphragm 19 in a liquid-tight seal. The attachment between the diaphragm 19 and the plate 16 can be improved, if desired, by bonding the two together. The assembly of the plate 16, rod 18 and diaphragm 19 together constitutes a diaphragm means of the invention, since all respond together to pressure-actuated movement of the diaphragm 19. The diaphragm may be formed of any flexible material, such as, for example, a flexible metal sheet or a flexible synthetic resin or cellulose derivative such as rubber, cellulose acetate, polytetrafluoroethylene, polypropylene, polyethylene, or polyvinylidene chloride.

The outer periphery of the diaphragm 19 is held in the joint between the two portions 11 and 12 of the housing in a liquid-tight seal. Thus, fluid is prevented from passing from one side of the diaphragm to the other, and from inside the housing to the outside. The diaphragm, plate and rod are free to move within the chamber 14, the rod being reciprocatingly supported upon the diaphragm 19. A pair of cup-shaped washers 20 and 21 locate a pair of coil springs 22 and 23. Spring 22 urges the diaphragm assembly toward the wall 15. The coil spring is selected according to the desired actuating pressure to permit the diaphragm assembly to move upwardly whenever the pressure at the lower surface of the diaphragm 19 exceeds that at the upper surface by an amount equal to the actuating pressure. The spring 23 assists upward movement of the diaphragm assembly by an amount determined by the spring characteristics and by the position of the adjusting screw 24. The screw is set so as to insure response of the device by movement of the diaphragm at the desired pressure differential. The large surface of the diaphragm provides great sensitivity to small changes in pressure differential across the faces of the diaphragm.

Introduction of fluid within the chamber 14 to both sides of the diaphragm 19 is by way of passage 25 and port 26 in the upper portion 11 of the housing, giving access to the portion of chamber 14 above the upper face of the diaphragm, and by way of passage 27 and port 28 in the lower portion 12 of the housing, giving access to the lower face of the diaphragm. These in turn are connected to the portions of the fluid system or systems across which the pressure differential is to be detected by the pressure indicator as, for example, to either side of a filter (not shown) to measure the pressure drop across the filter.

In order to prevent dirt carried by fluid from entering ports 26 and 28 and from reaching the narrower passages 25 and 27 and clogging these passages or the chamber 14, filter elements can be inserted in the enlarged outer portion of the ports.

In the embodiment of the invention shown in FIGURES 1 and 2, the pressure indicator is adapted to provide an electrical signal to warn of a clogged filter or to stop fluid flow.

A switch 30 is mounted in a recess 31, and affixed to the upper portion 11 of the housing. Also mounted in the recess is a lever 32, pivotally supported on the housing so as to extend above the rod 18. Attached to one end of the arm 32 is a set screw 33, and attached to the other end of the arm is a switch actuator 34 movable by the arm to actuate the switch 30 when the rod 18 rises into contact with the screw 33 and sufficiently moves arm 32. In order to restrict the motion of the diaphragm and prevent it from rising so far as to damage itself or the switch, the top wall of chamber 14 of the housing is low enough to intercept the diaphragm 19 at a limiting position. This position is such that the indicator is automatically reset upon return of the diaphragm 19 to the normal position. To provide a remote signal of actuation of the indicator, suitable conductors (not shown) from the switch 30 can be arranged in any conventional manner to complete appropriate electrical circuits whenever the switch is operated or reset.

In operation, fluid under pressure from port 28 passes through the passage 27 to the bottom of the chamber 14 below the diaphragm, urging the diaphragm 19 and the rod 18 upwardly against the force of the spring 22, and the fluid pressure above the diaphragm, communicated through passage 25 and port 26. Whenever the difference between the pressures across the diaphragm is greater than the differential force of the springs 22 and 23, the diaphragm assembly is driven upwardly, and the rod 18 contacts and lifts the screw 33, thus raising the lever 32 to actuate the switch 30 through application of pressure through the switch actuator 34. When the diaphragm 19 is fully deflected, it contacts the top of chamber 14, which serves as a stop to prevent further deflection, and prevents damage from overpressuring. Return of the diaphragm to its normal position upon correction of the excessive pressure differential draws the diaphragm back toward the wall 15 restoring the switch.

This device senses pressure differentials of from about 0.01 inch of water column to about 50 p.s.i.

As shown in FIGURE 3, a representative pressure indicator arranged to give a visual signal is obtained by modifying the structure of FIGURES 1 and 2, so as to provide in the upper portion 11 of the housing a transparent cap 40 which receives a colored extension 41 of rod 18'. The cap is attached to the housing in a leakproof seal by gasket 42. Whenever the diaphragm assembly is moved upwards into the contact with the top wall of chamber 18', the extension 41 of the rod 14 rises from the housing 11 to an indicating position in the cap 40. The rod extension can be painted an eye-catching color, for example, red.

It will be apparent from the above description that the pressure-responsive devices of the invention can be employed as pressure transducers to control operation of all sorts of devices such as, pumps, warning devices, switches, and the like in response to movement of the diaphragm elements by suitable adaptation. The pressure-responsive devices of the invention provide for appropriately large deflections of the diaphragms giving the devices the ability to sense a large range of pressure differentials, and room to provide for a relatively large movement of the diaphragm for a small pressure differential. At the same time, the large surface area of the diaphragm gives remarkable sensitivity to small changes in the normal pressure differential. Furthermore, since each face of the diaphragm is open to fluid pressure, the device responds directly to small pressure differentials practically independently of internal pressure and temperature. Since the device responds directly to pressure differentials, it eliminates the need for measuring two pressures with two pressure indicators, and avoids the problems of measuring accurately two high pressures with different indicators. The element is inexpensive, and easily mass-produced due to the simplicity of construction.

By proper spacing and configuration of the pressure chamber walls defined within the housing, the diaphragm can be fully supported when fully deflected within its stress limit, thus preventing overstressing and overpressuring of the diaphragm. The pressure-responsive devices can be used in any transducer system which is to be actuatable in response to the pressure differential between two systems or in two parts of the same system.

The diaphragm is held more or less fixed in position until the actuating pressure differential is reached. Therefore, the diaphragm has a longer life and is less subject to failure than those in which there is opportunity for the diaphragm to pulsate with each change in pressure. Furthermore, springs of a low rate can be used, to provide for a large rapid deflection of the diaphragm at the actuating pressure. This minimizes the danger of contact dither in the switch.

We claim:

1. A pressure-responsive device comprising a housing forming a chamber, a flexible diaphragm means mounted in the housing so as to divide the chamber into two compartments and capable of flexing movement away from and towards a first position; a stop for the diaphragm means on the housing against which the diaphragm rests in the normal first position; first bias means biased between the housing and the diaphragm, urging the diaphragm in a first direction; fluid duct means communicating with a source of fluid under pressure and with one compartment on one side of the diaphragm means to urge the diaphragm in a second direction opposite to the first; second bias means biased between the housing and the diaphragm urging the diaphragm means in the second direction; the two bias means being selected to exert a net differential force opposing movement of the diaphragm in the direction away from the stop approximately equal to the force of a predetermined pressure differential across the diaphragm means tending to move the diaphragm means away from the first position, and thereby normally retaining the diaphragm means against the stop in the first position; and indicating means connected to the diaphragm and actuated by movement of the diaphragm means in response to a pressure differential in excess of said predetermined pressure differential.

2. A pressure-responsive device in accordance with claim 1, in which the flexible diaphragm means comprises a diaphragm of flexible nonmetallic material and a metal plate attached thereto.

3. A pressure-responsive device in accordance with claim 1, including a second stop means limiting the motion of the diaphragm means in response to said excess of said predetermined pressure differential.

4. A pressure-responsive device according to claim 1 wherein the second bias means is adjustable to select the actuating pressure differential.

5. A pressure-responsive device according to claim 1 wherein the bias means are springs.

6. A pressure-responsive device according to claim 1, in which the indicating means comprises a switch means operable by motion of the diaphragm means.

7. A pressure-responsive device according to claim 1, comprising an indicator operable by motion of the diaphragm means.

8. A pressure-reponsive device comprising a housing forming a chamber, a flexible diaphragm means mounted in the housing so as to divide the chamber into two compartments and capable of flexing movement away from and towards a first position; the housing normally retaining the diaphragm means in the first position; first spring bias means biased between the housing and the diaphragm, urging the diaphragm in a first direction; first fluid duct means communicating with a first source of fluid under pressure and with one compartment on one side of the diaphragm means to urge the diaphragm in a second direction opposite to the first; second fluid duct means communicating with a second source of fluid under pressure and with a second compartment on the second side of the diaphragm means, second bias spring means biased between the housing and the diaphragm urging the diaphragm means in the second direction; the two bias means being selected to exert a net differential force opposing movement of the diaphragm in the direction away from the stop approximately equal to the force of a predetermined pressure differential across the diaphragm means tending to move the diaphragm means away from the first position, and thereby normally retaining the diaphragm means against the housing in the first position; and indicating means connected to the diaphragm and actuated by movement of the diaphragm means in response to a pressure differential in excess of said predetermined pressure differential.

References Cited by the Examiner

UNITED STATES PATENTS

| | | | |
|---|---|---|---|
| 1,173,038 | 2/16 | Roschanek | 73—407 |
| 2,138,152 | 11/38 | Grisdale | 73—407 |
| 2,824,186 | 2/58 | Binford | 73—406 X |
| 2,843,077 | 7/58 | Leefer | 73—38 X |
| 2,850,900 | 9/58 | Billington | 73—406 |
| 2,948,151 | 8/60 | Astl | 73—406 |
| 3,011,470 | 12/61 | Stroermer | 116—117 |
| 3,077,176 | 2/63 | Pall et al. | 116—117 |

LOUIS J. CAPOZI, *Primary Examiner.*

ROBERT L. EVANS, *Examiner.*